United States Patent
Hohn

(10) Patent No.: US 7,407,615 B2
(45) Date of Patent: Aug. 5, 2008

(54) METHOD FOR PRODUCING CONCRETE OR MORTAR USING A VEGETAL AGGREGATE

(75) Inventor: Heribert Hohn, Rollinger (LU)

(73) Assignee: Miscanthus-Holding, S.A., Luxembourg (LU)

( * ) Notice: Subject to any disclaimer, the term of this patent is extended or adjusted under 35 U.S.C. 154(b) by 580 days.

(21) Appl. No.: 10/344,102

(22) PCT Filed: Aug. 7, 2001
(Under 37 CFR 1.47)

(86) PCT No.: PCT/EP01/09113
§ 371 (c)(1),
(2), (4) Date: Jul. 30, 2004

(87) PCT Pub. No.: WO02/12145
PCT Pub. Date: Feb. 14, 2002

(65) Prior Publication Data
US 2005/0001359 A1    Jan. 6, 2005

(30) Foreign Application Priority Data
Aug. 9, 2000    (LU)    ......... 90627

(51) Int. Cl.
B28B 17/02    (2006.01)
B28B 1/00    (2006.01)
B28B 19/00    (2006.01)
B28B 3/00    (2006.01)

(52) U.S. Cl. ......... 264/333; 106/465; 106/738; 106/805; 106/817

(58) Field of Classification Search .......... 366/2, 366/6; 106/653, 731, 805, 738, 817, 464, 106/465, 613, 721, 795; 264/333
See application file for complete search history.

(56) References Cited

U.S. PATENT DOCUMENTS

| | | | | |
|---|---|---|---|---|
| 1,571,048 A * | 1/1926 | Garrow | ......... | 427/212 |
| 2,504,579 A * | 4/1950 | Perl | ......... | 106/731 |
| 2,623,828 A * | 12/1952 | Dove | ......... | 106/731 |
| 2,954,853 A * | 10/1960 | Maierson et al. | ......... | 188/234 |
| 3,264,125 A * | 8/1966 | Bourlin | ......... | 106/609 |
| 3,311,483 A * | 3/1967 | Garnier et al. | ......... | 106/653 |
| 3,393,261 A * | 7/1968 | Herzig et al. | ......... | 264/82 |
| 3,438,853 A * | 4/1969 | Haines, Jr. et al. | ......... | 162/164.7 |
| 3,563,844 A * | 2/1971 | Brown | ......... | 428/292.4 |
| 3,972,972 A * | 8/1976 | Yano et al. | ......... | 264/117 |
| 4,132,555 A * | 1/1979 | Barrable | ......... | 106/795 |
| 4,306,911 A * | 12/1981 | Gordon et al. | ......... | 106/644 |
| 4,325,457 A * | 4/1982 | Docherty et al. | ......... | 181/210 |
| 4,985,119 A * | 1/1991 | Vinson et al. | ......... | 162/149 |
| 5,019,170 A * | 5/1991 | Walter et al. | ......... | 106/805 |
| 5,062,897 A * | 11/1991 | Katsumata et al. | ......... | 106/696 |
| 5,108,679 A * | 4/1992 | Rirsch et al. | ......... | 264/118 |
| 5,324,469 A * | 6/1994 | Walter et al. | ......... | 264/234 |
| 5,690,729 A * | 11/1997 | Jones, Jr. | ......... | 106/682 |
| 5,744,078 A * | 4/1998 | Soroushian et al. | ......... | 264/82 |
| 5,958,130 A * | 9/1999 | Stroeml et al. | ......... | 106/653 |
| 6,063,183 A * | 5/2000 | Goisis et al. | ......... | 106/725 |
| 6,379,457 B1 * | 4/2002 | Yamamoto et al. | ......... | 106/731 |
| 6,509,397 B1 * | 1/2003 | Nagele et al. | ......... | 524/72 |
| PP14,743 P2 * | 5/2004 | Speichert et al. | ......... | Plt./384 |
| 2004/0065233 A1* | 4/2004 | Cook et al. | ......... | 106/805 |

FOREIGN PATENT DOCUMENTS

| | | | | |
|---|---|---|---|---|
| DE | 3921337 A1 | * | 1/1991 | |
| GB | 638501 A | * | 6/1950 | |
| HU | 51583 | | 5/1990 | |
| JP | 64-065052 A | * | 3/1989 | |
| JP | 08-119713 A | * | 5/1996 | |

OTHER PUBLICATIONS

EPO Abstract of DE 3921337 A1; Jan. 1991; European Patent Office. *
JPO Abstract of JP 64-065052 A; Oct. 1998; Japanese Patent Office.*
Machine translation of JP 08-119713 A; Mar. 2005; Japanese Patent Office website.*
Machine translation of JP 10-287457 A; Mar. 2005; Japanese Patent Office website.*
Miscanthus 'Giganteus'—Giant Chinese Silver Grass; Mar. 2005; http://www.bluestem.ca/miscanthus-giganteus.htm.*
Bakula and Kaucic, The Study of Autoclaved Cellulose Fiber-Reinforced Cement Composites, Cement and Concrete Research, vol. 25, No. 1 (1995) pp. 71-78.*

* cited by examiner

*Primary Examiner*—Matthew J. Daniels
(74) *Attorney, Agent, or Firm*—Stites & Harbison PLLC; Douglas E. Jackson

(57) ABSTRACT

A method for producing concrete or mortar based on an exclusively vegetal aggregate, a mineral binding agent, and mixing water is described. Instead of the vegetal aggregate being premineralized in a separate step of the operation, 4 to 14 kg of a non-hydratizable, finely ground mineralizator is added for each cubic meter of vegetable aggregate when the concrete or mortar is being mixed. Raw calcium carbonate is a preferred mineralizator.

15 Claims, No Drawings

METHOD FOR PRODUCING CONCRETE OR MORTAR USING A VEGETAL AGGREGATE

The present invention relates to a method for producing a concrete or mortar based on renewable raw materials.

PRIOR ART

The production of concrete and mortar based on an exclusively vegetal aggregate such as, for example, wood, hemp or reed fibers, is already known. In a first operational step during the production of such mortar, the shredded vegetal raw material is premineralized. During this premineralization, the vegetal particles are placed in a mineralization bath, or are wetted or sprayed with a mineralization liquid, when aluminum sulfate or cement is usually used as the mineralizator. The vegetal particles are then dewatered and dried. At the work site, the dried, premineralized particles can then be mixed with the mixing water and cement as aggregate to form a mortar. Premineralization of the vegetal aggregate ensures that a solid bond is formed between the vegetal aggregate and the hardened cement paste, so that the concrete or mortar possesses the desired bending tensile strength and resistance to pressure. In this respect, it should be noted that the known premineralization of the vegetal aggregate is costly and is, in addition, potentially harmful to the environment.

Older methods for producing concrete or mortar are also known; in these, vegetal aggregates that have not been premineralized are mixed with mineral aggregates, mixing water, and cement. These methods have not been successful in practice.

FR 1018109 (1952) describes a material for sound-absorbing floors and walls; it is preferred that this be composed as follows: 10% man-made cement, 10% ground chalk, 25% sand, 40% sawdust and 10% powdered cork. This particular patent specification does not explain what is meant by man-made cement. In addition, it should be noted that the material contains a total of 35% mineral aggregate and a very small percentage of binder. The patent specification in question also mentions very briefly that the mortar can be produced exclusively from cement, chalk, sand, and cork or from cement, chalk, sawdust, and cork. The patent specification FR 1018109 provides no additional details with respect to the mixing ratios of the last two mortars.

DE 847 725 (1952) describes a material for producing nail-holding stones, light structural panels, and floor coverings that contain no water-soluble magnesium compounds and is relatively cheap to produce. The material proposed for this is a mixture of wood dust or wood chips, limestone or grey marble (grain size of 0 to 1 mm), and cement. It is proposed that a mixture of two parts by weight of sawdust or wood chips, four parts by weight of ground grey marble, and three parts by weight of cement be used to produce nail-holding stones. It is proposed that a mixture of three parts by weight of sawdust mixed with wood shavings, or wood shavings mixed with wood chips, 10 parts by weight of ground grey marble, and six to seven parts by weight of cement be used to produce light structural panels. A mixture of four parts by weight of wood dust, 12 parts by weight of ground grey marble, and 20 parts by weight of cement is proposed for the production of floor coverings. When such a material hardens, the grey marble and the cement form a relatively heavy mineral matrix in which the wood fibers are bound. It can be assumed that this material with its relatively heavy mineral matrix does not provide special properties with respect to thermal insulation and acoustic insulation.

GB 638,501 (1950) describes an allegedly weatherproof material for producing panels, roofing panels, roofing tiles, pipes, and eave troughs. A preferred mixture for this material includes 30 parts by weight of paper or cellulose, 40 parts by weight of cement, 10 parts by weight of whiting, 10 parts by weight of hydrated lime, and 10 parts by weight of river mud. It can be assumed that this material does not provide good properties with respect to thermal insulation and acoustic insulation.

OBJECTIVE OF THE PRESENT INVENTION

It is the objective of the present invention to produce concrete and mortar based on a vegetal aggregate in a simple and economical manner; the hardened concrete/mortar is intended to have a relatively low specific weight, as well as good properties with respect to thermal insulation, acoustic insulation, bending tensile strength, and resistance to pressure.

GENERAL DESCRIPTION OF THE INVENTION

According to the present invention, this objective has been achieved by a method for producing concrete or mortar based on an exclusively vegetal aggregate, a mineral binding agent, and mixing water, the vegetal aggregate having a specific weight of 80-160 kg m$^3$ as measured at a residual moisture content of approximately 15%. There is no premineralization of the vegetal aggregate. In place of this, 4 to 14 kg (in the normal case, 6 to 12 kg) of a non-hydratizable finely ground mineralizator is added for each cubic meter of vegetal aggregate when the concrete or mortar is being mixed. A "non-hydratizable mineralizator" is understood to be a finely ground mineral substance which, in contrast to the binding agent, forms no hydrates with the mixing water as reaction products. It was established that the added mineralizator is deposited on the surface of the vegetal aggregate particles when the concrete/mortar is being mixed, and that during hardening it ensures that a solid bond is established between the particles of the vegetal aggregate and the mineral binding-agent matrix, so that the concrete or mortar possesses the required bending tensile strength and resistance to pressure. In other words, there is, as it were, a premineralization of the surface of the vegetal aggregate, beginning with the mixing process for the mortar, up until hydratation of the binding agent. The finer the mineralizator is ground, the faster and better it is deposited on the surface of the vegetal aggregate. It should also be noted that the mineralizator is deposited only on the surface of the vegetal aggregate particles and thus does not affect the cellular structure of the particles of the vegetal aggregate. In addition, the quantity of mineralizator that is added is so matched to the vegetal aggregate that it is sufficient for the complete mineralization of the surface of the vegetal aggregate particles, or is just enough that only a slight surplus remains. This avoids a larger quantity of the mineralizator being bound into the binding agent matrix between the vegetal aggregate particles when the concrete or mortar hardens. In conclusion, it must be said that the method according to the present invention permits a drastic reduction of the production costs associated with the vegetal aggregate, because it renders superfluous the costly premineralization that is carried out in a separate step of the operation. In addition, dispensing with the separate premineralization in a separate operational step also eliminates environmental concerns with respect to the production method for concrete and mortar based on a vegetal aggregate. The non-vegetal constituents of the concrete/mortar according to the present invention are restricted to the mineral binding agent and the small addition of mineralizator. Most surprisingly, despite this, the hardened concrete/mortar displays outstanding bending tensile strength and resistance to pressure. Because of its large percentage of vegetal aggregate with a low specific weight and a mineral binding agent matrix without other mineral fillers, the hardened concrete/mortar is also of a relatively low specific weight and has good properties with respect to thermal insulation and acoustic insulation.

It is an advantage that the mineralizator is a finely ground stone dust, at least 80%-mass of the stone dust having a grain size of less than 0.09 mm. Essentially, a preferred mineralizator includes commercially available, raw calcium carbonate. Advantages of the raw calcium carbonate include the facts that it is extremely inexpensive, can be very finely ground, forms a good suspension in water and, in addition, has a low specific weight of only 1.18 t/m$^3$. The mixing ratio of mineralizator to mixing water amounts to 25 to 50 kg mineralizator in 1,000 kg water.

An advantageous binding agent is, for example, Portland cement, in particular PZ 42.5 Grade Portland cement. In the event that plastering mortar is to be produced, a hydratizable lime such as white lime is added to the Portland cement. Depending on the type of mineral binding agent and the purpose for which the concrete/mortar is to be used, between 180 and 400 kg of mineral binding agent is added to each cubic meter of the vegetal aggregate.

It is preferred that the vegetal aggregate be composed of fibrous particles with diameters ranging from 0 to 5.0 mm. If a light concrete or light wash floor is to be produced, it is advantageous if the vegetal aggregate be made up for the most part of fibrous particles 5 mm to 40 mm long. If light plaster or thermal insulation plaster is to be produced, it is an advantage if the vegetal aggregate be made up for the most part of fibrous particles that are shorter than 5 mm.

It is preferred that the vegetal aggregate be produced from fibrous, rapidly growing plants, for example, by shredding. The following, amongst others, can be used: the wood of coniferous trees, hemp, and reeds. The wood from deciduous trees is not suitable because of its high sugar content. Above all, it is all the plants of the $C_4$ group, which are characterized by a high level of photosynthesis performance, that are preferred. The rapidly growing plants of the Miscanthus family are particularly useful. A preferred type of Miscanthus is Miscanthus Giganteus, which has a very high silicon content. The mortars and light concretes that are produced using the method according to the present invention yield products that posses a high level of dimensional stability once they have hardened.

However, mixtures of different plants can be used as raw materials for the aggregate.

Description of a Test

A mortar made up as follows was mixed in a pan mixer:
Aggregate:
1 m$^3$ consisting of ⅓ coniferous wood+⅓ hemp+⅓ Miscanthus, shredded, particle diameter from 0 to 5 mm; length of the particles from 5-40 mm; residual moisture less than 18%.
Binding Agent:
280 kg Portland cement (PZ 42.5 Grade) and 100 kg white lime
Mineralizator:
9 kg commercial calcium carbonate consisting (according to the manufacturer) of 95% $CaCO_3$ (raw), and 5% other material, 85%-mass being of a grain size ranging from 0 mm to 0.09 mm, maximum supergrain size 2 mm.
Mixing Water:
250 liters, temperature approximately 18° C., to achieve a K1 consistency (slightly moist).

During the mixing process, the aggregate materials, the mixing water, the binding agent, and the mineralizator are mixed together for two minutes in a positive mixer (e.g., a pan mixer). The sequence in which the additives are introduced is unimportant. In order to prevent the mixture sticking together and forming lumps in the pan mixer, it is, however advantageous to add the vegetal aggregate and the mixing water to the plate mixer first of all, before the mineralizator and the binding agent are added.

A mortar, mixed as described above, was examined by the Department of Mechanical Engineering and Building Construction of the Rheinisch-Westfälische Technische Hochschule (RWTH) [North Rhine-Westphalia College of Technology], Aachen, Germany (hereinafter: examining institute) and poured into steel molds measuring 40 mm×40 mm×100 mm, lightly tamped, and stripped. These molded test bodies were stored for 28 days at a temperature of 18-20° C. in the examining institute's environmental chamber so as to set up. The examining institute then tested 11 of these tests bodies in accordance with DIN EN 196 04 with respect to their bending tensile strength and resistance to pressure. The arithmetic average values for the 11 test bodies were as follows: 3.64 N/mm$^2$, bending tensile strength; 9.43 N/mm$^2$ resistance to pressure. The DIN Standard requires only 1 N/mm$^2$ bending tensile strength and 5 N/mm$^2$ resistance to pressure for finishing mortar.

Use of the Concrete or Mortar

The concrete or mortar produced by the method according to the present invention is excellent for the production of ecological and heat absorbing, light concrete, mortar for interior and external finishing, wash or cast plaster floors, as well as for ecological and thermal insulation and finished wall elements, building blocks, and insulating panels. These products are used both in new ecological structures, e.g., single and multifamily housing, as well as when renovating existing buildings, e.g., when retrofitting a wooden decks with impact-sound insulation, when the relatively low dead weight of the finished product (depending on composition, 350/550 kg/m$^3$) is used to its best advantage.

The invention claimed is:

1. Method for producing concrete or mortar based on an exclusively vegetal aggregate, a mineral binding agent, and mixing water, the vegetal aggregate having a specific weight of 80 to 160 kg/m$^3$, as measured at a residual moisture of approximately 15%, characterized in that 4 to 14 kg of a non-hydratizable, finely ground mineralizator is added for each cubic meter of the vegetal aggregate when the concrete or mortar is being mixed.

2. Method as defined in claim 1, characterized in that the mineralizator is a finely ground stone dust.

3. Method as defined in claim 1, characterized in that at least 80%-mass of the mineralizator that is added has a grain size of less than 0.09 mm.

4. Method as defined in claim 1, characterized in that the mineralizator essentially includes raw calcium carbonate.

5. Method as defined in claim 1, characterized in that the mineral binding agent includes Portland cement.

6. Method as defined in claim 1, characterized in that the mineral binding agent is a mixture of Portland cement and white lime.

7. Method as defined in claim 1, characterized in that between 180 and 400 kg of mineral binding agent is added for each cubic meter of the vegetal aggregate.

8. Method as defined in claim 1, characterized in that the mixing ratio of mineralizator to mixing water amounts to 25 kg to 50 kg of mineralizator to 1,000 kg of water.

9. Method as defined in claim 1, characterized in that the vegetal aggregate is composed for the most part of fibrous particles with diameters equal to or less than 5.0 mm.

10. Method as defined in claim 9, characterized in that a light concrete or a light wash floor is produced, the vegetal aggregate comprising fibrous particles with the lengths ranging from 5 mm to 40 mm.

11. Method as defined in claim 9, characterized in that a light plaster or thermal insulation plaster is produced, the vegetal aggregate comprising fibrous particles with lengths of less than 5 mm.

12. Method as defined in claim 1, characterized in that coniferous wood, hemp and/or reeds are used during the production of the vegetal aggregate.

13. Method as defined in claim 1, characterized in that plants of the Miscanthus family are used for the production of the vegetal aggregate.

14. Method as defined in claim 13, characterized in that the plant Miscanthus Giganteus is used for production of the vegetal aggregate.

15. Method as defined in claim 1, characterized in that the method is used for producing light concrete, light mortar, light wash floor, as well as light plaster and thermal insulation plaster.

* * * * *